Figure 1:
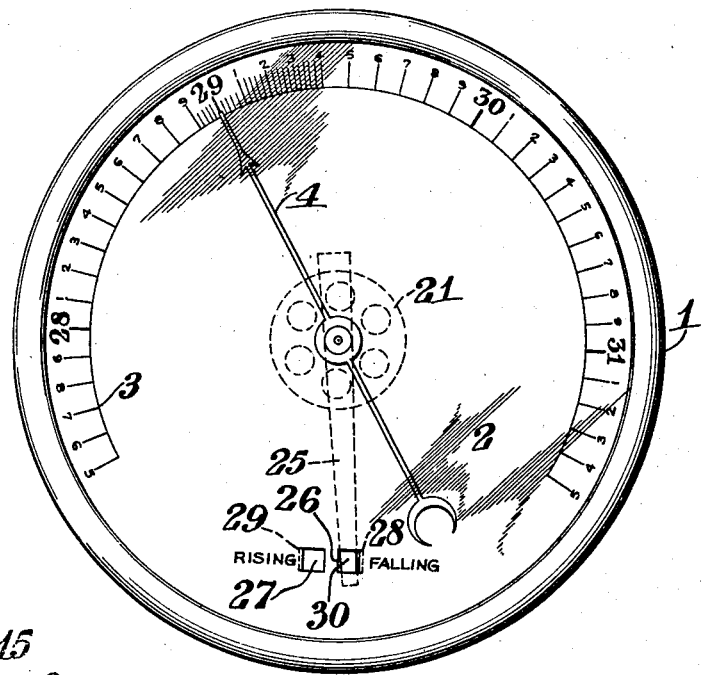

March 26, 1935.  J. SCHOFIELD  1,995,436

BAROMETER

Filed May 27, 1933

INVENTOR
Joseph Schofield
BY D. Clyde Jones
ATTORNEY

Patented Mar. 26, 1935

1,995,436

UNITED STATES PATENT OFFICE 1,995,436

BAROMETER

Joseph Schofield, Rochester, N. Y., assignor to Taylor Instrument Companies, Rochester, N. Y., a corporation of New York Application May 27, 1933, Serial No. 673,262

4 Claims. (Cl. 116—129)

This invention relates to barometers.

As is well understood, barometric pressure is an important factor in connection with weather forecasting and while it is not the sole criterion it is generally translated into terms of weather conditions to follow within a certain time interval.

Some barometers are provided with legends and reference characters for interpreting the barometric pressures and the present invention is especially adapted for embodiment in such barometers.

The principal difficulty experienced with an indicating barometer of this type is the uncertainty, at the time of the observation, as to whether the pressure is rising or falling. This uncertainty gives rise to errors in forecasting weather conditions, since the interpretation on the rising pressure curve is materially different from that on the falling pressure curve.

It is the object of this invention to provide novel means in a barometer for indicating whether the barometric pressure is rising or falling.

Figure 3:
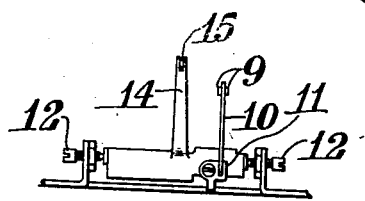
Figure 4:
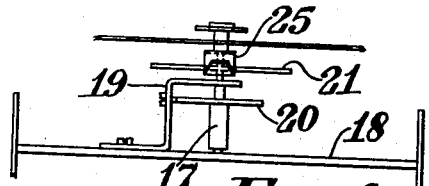
Figure 2:
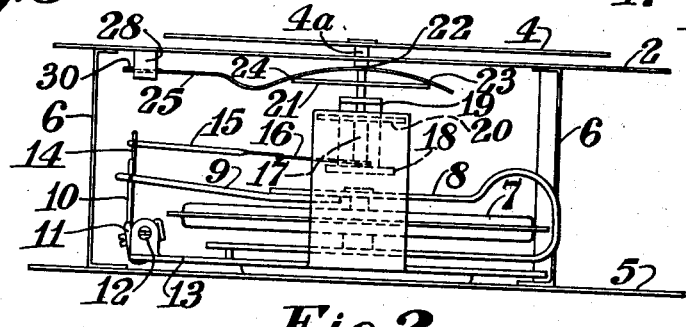

For a complete understanding of the invention and the principle of operation on which it is based, reference is made to the accompanying drawing wherein Fig. 1 is a front view of a barometer embodying the invention; Fig. 2 is a side elevation of the barometer of Fig. 1 with the casing removed; Fig. 3 is a detail view of the lever arrangement for translating any compression of the aneroid chamber into corresponding rotation of the instrument pointer; and Fig. 4 is a detail view of the arrangement for mounting the arbor.

In Fig. 1, 1 designates the barometer casing, 2 the dial therein provided with a barometric pressure scale 3, and 4 an index or pointer cooperating with the scale. In accordance with the usual practice the barometer mechanism within the casing includes a frame 5 having the uprights 6 on which the dial 2 is supported in spaced relation to the base of the frame. On the frame there is supported an aneroid chamber 7 having its lower face fixed and having its upper face fastened to the free end of a U-shaped mainspring 8, which has its other end secured to the base in any suitable manner. The free end of the mainspring is connected by an arm 9 to one end of a link 10, the other end of which is pivotally connected to the arm 11 of a calibrating lever, in turn, pivoted at 12 on extension 13 of the frame. The other arm 14 of the calibrating lever has connected thereto a link 15 which terminates in a chain 16 having its other end wrapped around an enlarged portion of the arbor 17. This arbor which is mounted for rotation on a vertical axis in a cross-bar 18 of the frame and spaced bracket 19 attached thereto, at its upper end is detachably engaged by the collar 4a of the index or pointer 4. A hairspring indicated at 20 having its ends respectively attached to bracket 19 and to the arbor, tends to rotate the arbor in a direction opposite to the pull on the chain 16 resulting from the compression of the aneroid chamber 7.

In accordance with the present invention there is secured at an intermediate point on the arbor 17, a disc 21 which frictionally engages a tendency indicator 25 in the form of a leaf spring having a perforation 22 therein to receive the upper portion of the arbor. This indicator is flexed to engage the lower surface of the collar 4a of the pointer 4 and points 23 and 24 on the edge of the disc 21. The free end of this indicator has a limited range of movement behind the window comprising the openings 26 and 27 which are cut in the dial as shown in Fig. 1. Suitable stops 28 and 29, which are preferably struck out of the dial to form the window openings, limit the movement of the indicator. The upper surface 30 of the indicator is preferably covered with a material of contrasting color to that of the dial 2.

From the foregoing it will be understood that when the barometric pressure rises, the barometer mechanism operates the arbor 17 to rotate the pointer 4 in a clockwise direction, the disc 21 which is mounted on the arbor and which frictionally engages the indicator 25 at points 23 and 24, also rotates this indicator until its portion 30 is under the window opening 27. When, however, the barometric pressure is falling the barometer mechanism relieves the pull on the chain 16 so that the hairspring 20 moves the arbor 17 and its pointer 4 in a counterclockwise direction. This movement of the arbor rotates the disc 21 which, through its frictional engagement with the indicator 25, moves the indicating portion 30 thereof under the window opening 26.

It will be understood that the present disclosure of the invention is merely given by way of example and that there may be various changes and modifications thereof within the scope of the claims without departing from the spirit of the invention.

I claim:

1. In a barometer, the combination with a dial having a window therein, a pointer and an operating mechanism thereof, of an indicator behind said dial and movable in accordance with the movement of said pointer, and means for limiting the movement of said indicator only to various positions within the range of said window to indicate the direction of movement of said pointer.

2. In a barometer, the combination with a dial having two openings therein comprising a window, a pointer and an operating mechanism thereof, of an indicator mounted behind said dial, and means for moving said indicator behind one or the other of said openings in accordance with the direction of movement of said pointer.

3. In a barometer, a dial having a window therein, a pointer in front of said dial, operating mechanism behind said dial and responsive to atmospheric pressure for moving said pointer with respect to said dial, an indicator movable only to various positions behind said window in accordance with the direction of movement of said pointer, and means for limiting the movement of said indicator only to positions behind said window.

4. In a barometer, a dial having a window therein, a stop adjacent each side of said window, a pointer in front of said dial, operating mechanism behind said dial and responsive to atmospheric pressure for moving said pointer with respect to said dial, and an indicator movable only to various positions between said stops in accordance with the direction of movement of said pointer.

JOSEPH SCHOFIELD.